W. C. EBERHART & S. GLASER.
ROLLER BEARING HUB.
APPLICATION FILED JUNE 15, 1911.
1,022,307.
Patented Apr. 2, 1912.
2 SHEETS—SHEET 1.
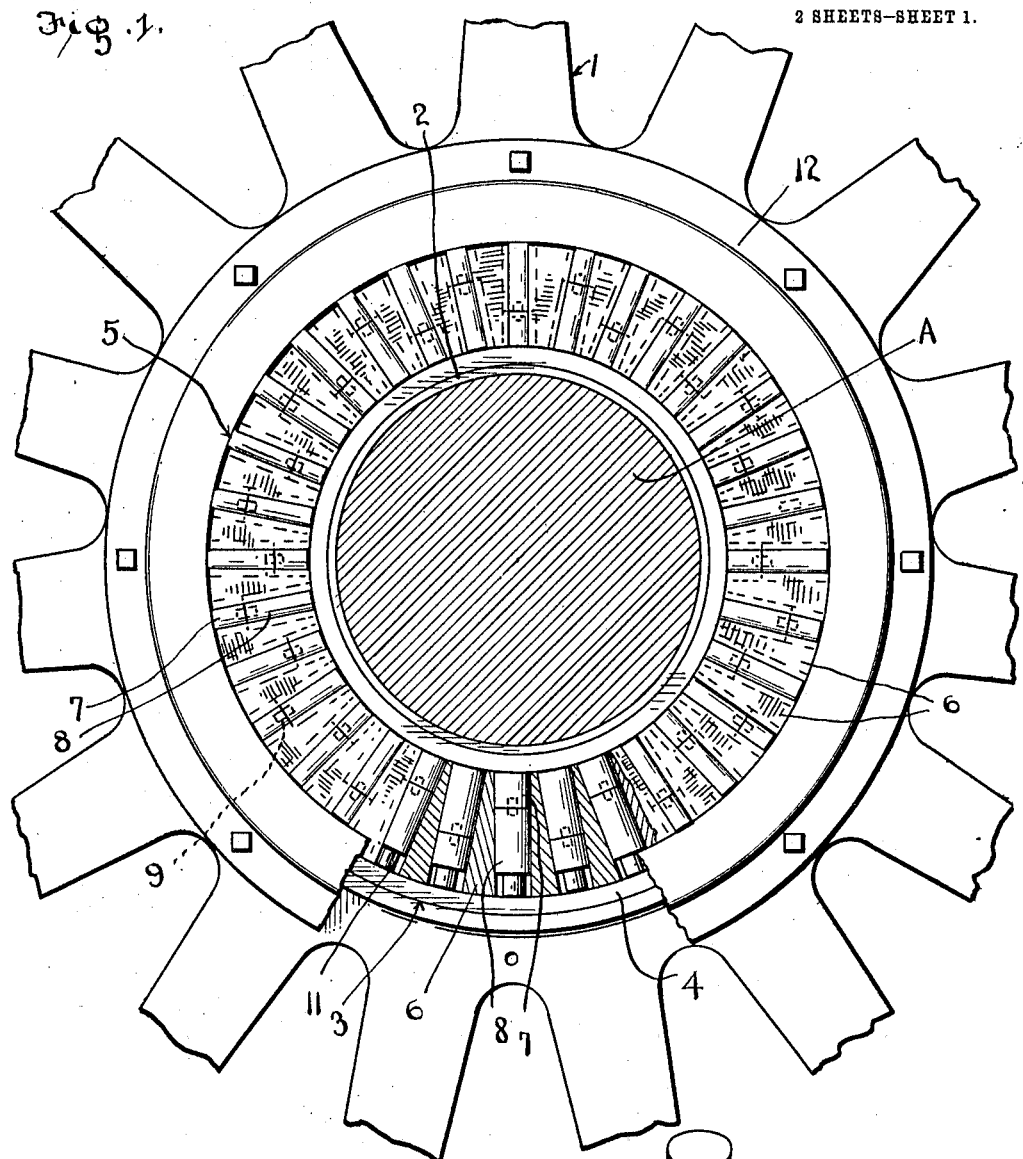
Fig. 1.
Fig. 5. 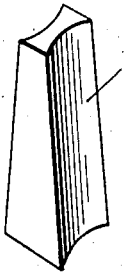 Fig. 6. 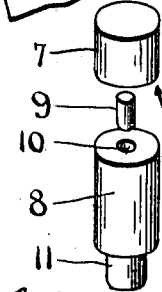
Witnesses
L. B. James
L. O. Hilton
Inventors
William C. Eberhart
Simon Glaser
by H. B. Willson & Co.
Attorneys W. C. EBERHART & S. GLASER.
ROLLER BEARING HUB.
APPLICATION FILED JUNE 15, 1911.
1,022,307.
Patented Apr. 2, 1912.
2 SHEETS—SHEET 2.
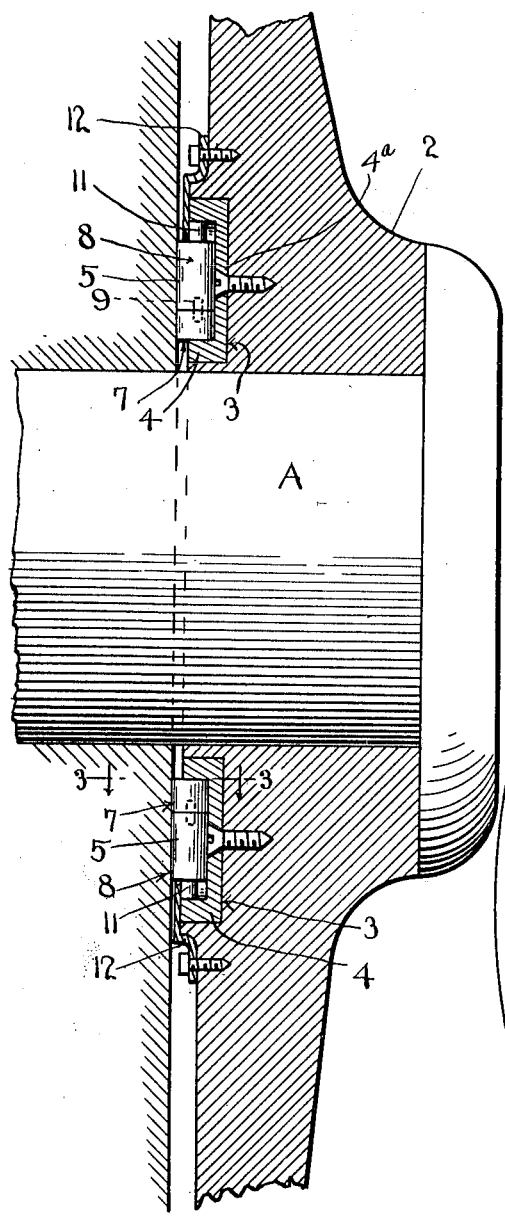
Fig. 2.
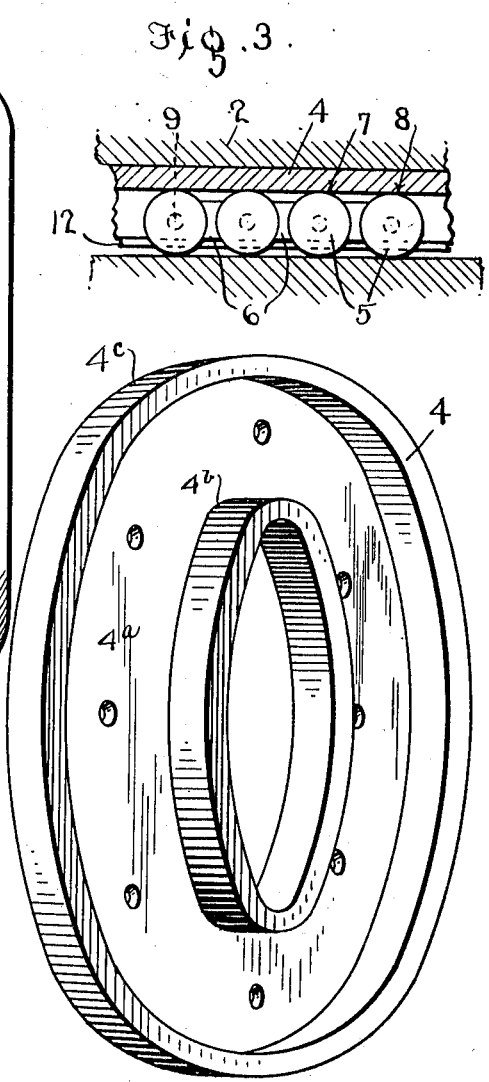
Fig. 3.
Fig. 4.
Witnesses
L. B. James
L. O. Hilton
Inventors
William C. Eberhart,
Simon Glaser
by H. B. Willson & Co.
Attorneys

UNITED STATES PATENT OFFICE.

WILLIAM C. EBERHART AND SIMON GLASER, OF SAYRE, PENNSYLVANIA.

ROLLER-BEARING HUB.

1,022,307.   Specification of Letters Patent.   Patented Apr. 2, 1912.

Application filed June 15, 1911. Serial No. 633,374.

*To all whom it may concern:*

Be it known that we, WILLIAM C. EBERHART and SIMON GLASER, citizens of the United States, residing at Sayre, in the county of Bradford and State of Pennsylvania, have invented certain new and useful Improvements in Roller-Bearing Hubs; and we do declare the following to be a full, clear, and exact description of the invention, such as will enable others skilled in the art to which it appertains to make and use the same.

This invention relates to improvements in roller bearing hubs especially designed for use on railway engines.

The object of the invention is to provide a hub with means for preventing friction and the breakage of the engine frame when rounding curves.

Another object is to provide a bearing for engine wheels which is inexpensive and which will withstand wear for a long period.

With these and other objects in view, the invention comprises certain novel constructions, combinations, and arrangements of parts, as will be hereinafter more fully described and claimed.

In the accompanying drawings:—Figure 1 represents a side elevation through a portion of a wheel equipped with this improved bearing, showing it applied and with parts broken out; Fig. 2 is a vertical section thereof; Fig. 3 is an enlarged detail sectional view of a portion of the bearing on line 3—3 of Fig. 2; Fig. 4 is a perspective view of the casing; Fig. 5 is a detail perspective view of one of the spacing blocks or fillers; Fig. 6 is a similar view of one of the rollers with the parts in juxtaposition.

In the embodiment illustrtaed a wheel 1 is shown mounted on an axle A and having a hub 2 counter bored at 3 to receive a cast steel casing 4 which is secured to the hub by countersunk bolts or in any suitable manner. This casing as shown, is constructed of an annular disk 4ª, having annular flanges 4ᵇ and 4ᶜ projecting laterally from the inner and outer edges of the one face of said disk.

A plurality of rollers 5 are arranged transversely in this casing 4 with radially disposed wedge-shaped filler blocks 6 arranged between them. These blocks may if desired, be grooved on their opposite faces to receive the rollers, the reduced portion of the blocks extending inwardly toward the axle. These blocks may be composed of any suitable material preferably of wrought iron or steel.

The rollers 5 are constructed of steel and are composed of sections 7 and 8 which are revoluble relatively to each other, said sections being arranged in longitudinal alinement and connected by pins 9 loosely mounted in registering sockets 10 formed in the adjacent ends of the sections. The outer sections 8 have their outer ends reduced as shown at 11 to provide for the mounting of a plate 12 for holding the rollers in position, said plate being secured to the hub by bolts. This plate is constructed of sheet iron about one sixteenth of an inch thick, more or less, and extends over the reduced ends of the rollers as shown clearly in Fig. 2.

The outer sections of the alternate rollers are made longer than the inner sections to dispose the joints of the adjacent rollers in staggered relation, as is shown in Fig. 1.

This roller bearing being arranged between the wheel hub and the driving box which seldom receives any oil, greatly relieves the strain at this point preventing breakage of the frame. With an eighty ton engine the pressure against the hub will be very great and with wheels constructed in the ordinary manner the friction between the hubs and drive boxes is very great, thus causing great strain on the frame which sometimes causes it to break. Such breakage will be prevented by the use of this hub roller bearing.

These bearings are much less expensive than the brass hub lining now in use and will last much longer.

The outer radius of the hub being greater than the inner radius necessitates the rollers being made in sections to permit the outer sections to revolve faster than the inner sections.

From the foregoing description, taken in connection with the accompanying drawings, the construction and operation of the invention will be readily understood without requiring a more extended explanation.

Various changes in the form, proportions and the minor details of construction may be resorted to without departing from the principle or sacrificing any of the advantages of the invention, as claimed.

We claim as our invention:—

A roller bearing hub having an annular recess in one face, a bearing casing mounted in said recess and composed of an annular disk having flanges extending laterally from both the edges of one face thereof, radially disposed rollers arranged in said casing with their opposite ends engaging the inner faces of said flanges, said rollers being composed of sections of different lengths arranged in longitudinal alinement and connected to revolve independently of each other, the outer ends of said rollers being reduced, and a fastening plate secured to said hub and over-lapping said reduced roller ends.

In testimony whereof we have hereunto set our hands in presence of two subscribing witnesses.

WILLIAM C. EBERHART.
SIMON GLASER.

Witnesses:
A. D. LAWS,
A. E. WINLACK.

Copies of this patent may be obtained for five cents each, by addressing the "Commissioner of Patents, Washington, D. C."